US012129127B2

(12) United States Patent
Allen et al.

(10) Patent No.: US 12,129,127 B2
(45) Date of Patent: Oct. 29, 2024

(54) DYNAMIC PROCESSING OF OBJECTS PROVIDED IN ELEVATED VEHICLES WITH EVACUATION SYSTEMS AND METHODS FOR RECEIVING OBJECTS

(71) Applicant: Berkshire Grey Operating Company, Inc., Bedford, MA (US)

(72) Inventors: Thomas Allen, Reading, MA (US); Benjamin Cohen, Somerville, MA (US); John Richard Amend, Jr., Belmont, MA (US); Joseph Romano, Arlington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 18/384,893

(22) Filed: Oct. 30, 2023

(65) Prior Publication Data
US 2024/0174454 A1     May 30, 2024

Related U.S. Application Data

(63) Continuation of application No. 17/953,982, filed on Sep. 27, 2022, now Pat. No. 11,866,269.
(Continued)

(51) Int. Cl.
*B65G 67/40*     (2006.01)
*B65G 37/00*     (2006.01)
*B65G 43/08*     (2006.01)

(52) U.S. Cl.
CPC ........... *B65G 43/08* (2013.01); *B65G 37/005* (2013.01); *B65G 67/40* (2013.01)

(58) Field of Classification Search
None
See application file for complete search history.

(56) References Cited

U.S. PATENT DOCUMENTS 3,721,354 A * 3/1973 Raynes et al. ........... B65G 1/04
                                                      414/396
3,734,286 A    5/1973 Simjian
(Continued)

FOREIGN PATENT DOCUMENTS

AU    2006204622 A1    3/2007
CA       2985166 A1    12/2016
(Continued)

OTHER PUBLICATIONS

Annex to Form PCT/ISA/206 (Partial Search) issued by the International Searching Authority (the European Patent Office) in related international application No. PCT/US2022/045671 on Jan. 30, 2023.
(Continued)

*Primary Examiner* — Joseph A Dillon, Jr.
(74) *Attorney, Agent, or Firm* — Gesmer Updegrove LLP

(57) ABSTRACT

A system is disclosed for receiving a plurality of objects from an elevated trailer of a tractor trailer. The system includes a collection conveyor extending between a base end and a coupled end, the coupled end being rotatably coupled to an evacuation conveyor, said collection conveyor including an object facing surface between the base end and the coupled end for receiving the plurality of objects, said collection conveyor being rotatably adjustable with respect to the evacuation conveyor at the coupled end, and both the evacuation conveyor and the coupled end of the collection conveyor being elevationally adjustable.

32 Claims, 11 Drawing Sheets

Related U.S. Application Data

(60) Provisional application No. 63/252,812, filed on Oct. 6, 2021.

(56) References Cited

U.S. PATENT DOCUMENTS

| | | | |
|---|---|---|---|
| 3,779,405 | A | 12/1973 | Kavanaugh, Jr. |
| 3,827,585 | A * | 8/1974 | McWilliams .......... B65G 67/08 |
| | | | 414/398 |
| 4,186,836 | A | 2/1980 | Wassmer et al. |
| 4,253,791 | A | 3/1981 | Van Drie |
| 4,557,659 | A | 12/1985 | Scaglia |
| 4,722,653 | A | 2/1988 | Williams et al. |
| 4,759,439 | A | 7/1988 | Hartlepp |
| 4,776,742 | A | 10/1988 | Felder |
| 4,780,041 | A * | 10/1988 | Ashby, Jr. .............. B65G 67/08 |
| | | | 198/588 |
| 4,802,810 | A | 2/1989 | Gunn |
| 4,815,582 | A | 3/1989 | Canziani |
| 4,846,335 | A | 7/1989 | Hartlepp |
| 5,352,081 | A | 10/1994 | Tanaka |
| 5,460,271 | A | 10/1995 | Kenny et al. |
| 5,509,723 | A | 4/1996 | Bratlie |
| 5,595,263 | A | 1/1997 | Pignataro |
| 5,685,687 | A | 11/1997 | Frye |
| 5,764,013 | A | 6/1998 | Yae |
| 5,839,566 | A | 11/1998 | Bonnet |
| 6,011,998 | A | 1/2000 | Lichti et al. |
| 6,059,092 | A | 5/2000 | Jerue et al. |
| 6,076,023 | A | 6/2000 | Sato |
| 6,401,936 | B1 | 6/2002 | Isaacs et al. |
| 6,402,451 | B1 | 6/2002 | Brown |
| 6,431,346 | B1 | 8/2002 | Gilmore et al. |
| 6,579,053 | B1 | 6/2003 | Grams et al. |
| 6,721,444 | B1 | 4/2004 | Gu et al. |
| 6,931,829 | B2 * | 8/2005 | Zehavi ................... A01D 46/26 |
| | | | 56/340.1 |
| 7,313,464 | B1 | 12/2007 | Perreault et al. |
| 7,474,939 | B2 | 1/2009 | Oda et al. |
| 7,516,848 | B1 | 4/2009 | Shakes et al. |
| 7,861,844 | B2 | 1/2011 | Hayduchok et al. |
| 8,662,314 | B2 | 3/2014 | Jones et al. |
| 8,718,814 | B1 | 5/2014 | Clark et al. |
| 8,874,270 | B2 | 10/2014 | Ando |
| 8,952,284 | B1 | 2/2015 | Wong et al. |
| 8,972,045 | B1 | 3/2015 | Mountz et al. |
| 9,061,868 | B1 | 6/2015 | Paulsen et al. |
| 9,120,622 | B1 | 9/2015 | Elazary et al. |
| 9,227,323 | B1 | 1/2016 | Konolige et al. |
| 9,259,844 | B2 | 2/2016 | Xu et al. |
| 9,283,680 | B2 | 3/2016 | Yasuda et al. |
| 9,415,949 | B2 | 8/2016 | Buse |
| 9,457,970 | B1 | 10/2016 | Zevenbergen et al. |
| 9,486,926 | B2 | 11/2016 | Kawano |
| 9,492,923 | B2 | 11/2016 | Wellman et al. |
| 9,517,492 | B2 * | 12/2016 | Schwarzbauer .......... B07C 5/34 |
| 9,520,012 | B2 | 12/2016 | Stiernagle |
| 9,604,363 | B2 | 3/2017 | Ban |
| 9,604,797 | B2 * | 3/2017 | Heitplatz ................ B65G 67/08 |
| 9,744,669 | B2 | 8/2017 | Wicks et al. |
| 9,828,195 | B1 | 11/2017 | Criswell |
| 10,206,519 | B1 | 2/2019 | Gyori et al. |
| 10,618,745 | B2 * | 4/2020 | Wagner ................ B65G 65/06 |
| 10,787,325 | B1 * | 9/2020 | Pippin .................... B65G 57/03 |
| 10,954,084 | B2 * | 3/2021 | Stenson ............... B65G 69/003 |
| 11,034,529 | B2 | 6/2021 | Wagner et al. |
| 11,267,662 | B2 | 3/2022 | Geyer et al. |
| 11,292,676 | B2 * | 4/2022 | Stenson ................ B65G 67/54 |
| 11,400,493 | B2 * | 8/2022 | Wagner ................... B60P 3/007 |
| 11,827,464 | B2 * | 11/2023 | Stenson ................. B65G 65/46 |
| 11,884,495 | B2 * | 1/2024 | Wagner ................ B65G 47/493 |
| 2002/0134056 | A1 | 9/2002 | Dimario et al. |
| 2002/0179502 | A1 | 12/2002 | Cerutti et al. |
| 2003/0042112 | A1 | 3/2003 | Woerner et al. |
| 2004/0112032 | A1 * | 6/2004 | Zehavi ................... A01D 46/26 |
| | | | 56/329 |
| 2004/0112719 | A1 | 6/2004 | Gilmore et al. |
| 2004/0144618 | A1 | 7/2004 | McDonald et al. |
| 2005/0002772 | A1 | 1/2005 | Stone |
| 2006/0153667 | A1 | 7/2006 | Pruteanu et al. |
| 2006/0242785 | A1 | 11/2006 | Cawley et al. |
| 2006/0260913 | A1 | 11/2006 | Wolf et al. |
| 2008/0181753 | A1 | 7/2008 | Bastian et al. |
| 2010/0125361 | A1 | 5/2010 | Mougin et al. |
| 2010/0180711 | A1 | 7/2010 | Kilibarda et al. |
| 2010/0217528 | A1 | 8/2010 | Sato et al. |
| 2010/0241260 | A1 | 9/2010 | Kilibarda et al. |
| 2011/0144798 | A1 | 6/2011 | Freudelsperger |
| 2012/0118699 | A1 | 5/2012 | Buchmann et al. |
| 2013/0343640 | A1 | 12/2013 | Buehler et al. |
| 2014/0005831 | A1 | 1/2014 | Naderer et al. |
| 2014/0067121 | A1 | 3/2014 | Brooks et al. |
| 2014/0067127 | A1 | 3/2014 | Gotou |
| 2014/0205403 | A1 | 7/2014 | Criswell |
| 2014/0244026 | A1 | 8/2014 | Neiser |
| 2014/0277693 | A1 | 9/2014 | Naylor |
| 2014/0291112 | A1 | 10/2014 | Lyon et al. |
| 2014/0341694 | A1 | 11/2014 | Girtman et al. |
| 2014/0341695 | A1 | 11/2014 | Girtman et al. |
| 2014/0360924 | A1 | 12/2014 | Smith et al. |
| 2014/0364998 | A1 | 12/2014 | Neiser et al. |
| 2015/0037123 | A1 | 2/2015 | Hobbs |
| 2015/0037131 | A1 | 2/2015 | Girtman et al. |
| 2015/0057793 | A1 | 2/2015 | Kawano |
| 2015/0063972 | A1 | 3/2015 | Girtman et al. |
| 2015/0063973 | A1 | 3/2015 | Girtman et al. |
| 2015/0073589 | A1 | 3/2015 | Kohdl et al. |
| 2015/0098775 | A1 | 4/2015 | Razumov |
| 2015/0224650 | A1 | 8/2015 | Xu et al. |
| 2015/0274447 | A1 | 10/2015 | McCollum et al. |
| 2015/0306634 | A1 | 10/2015 | Maeda et al. |
| 2015/0308466 | A1 | 10/2015 | Girtman et al. |
| 2015/0352721 | A1 | 12/2015 | Wicks et al. |
| 2015/0360882 | A1 | 12/2015 | Girtman |
| 2015/0369618 | A1 | 12/2015 | Barnard et al. |
| 2015/0375398 | A1 | 12/2015 | Penn et al. |
| 2015/0375880 | A1 | 12/2015 | Ford et al. |
| 2016/0027093 | A1 | 1/2016 | Crebier |
| 2016/0075521 | A1 | 3/2016 | Puchwein et al. |
| 2016/0096694 | A1 | 4/2016 | Baylor et al. |
| 2016/0136816 | A1 | 5/2016 | Pistorino |
| 2016/0199884 | A1 | 7/2016 | Lykkegaard et al. |
| 2016/0221187 | A1 | 8/2016 | Bradski et al. |
| 2016/0221762 | A1 | 8/2016 | Schroader |
| 2016/0221766 | A1 | 8/2016 | Schroader et al. |
| 2016/0243704 | A1 | 8/2016 | Vakanski et al. |
| 2016/0244262 | A1 | 8/2016 | O'Brien et al. |
| 2016/0264366 | A1 | 9/2016 | Heitplatz |
| 2016/0280477 | A1 | 9/2016 | Pippin |
| 2016/0368720 | A1 | 12/2016 | Criswell |
| 2017/0021499 | A1 | 1/2017 | Wellman et al. |
| 2017/0043953 | A1 | 2/2017 | Battles et al. |
| 2017/0050315 | A1 | 2/2017 | Henry et al. |
| 2017/0057091 | A1 | 3/2017 | Wagner et al. |
| 2017/0066597 | A1 | 3/2017 | Hiroi |
| 2017/0073175 | A1 | 3/2017 | Wicks et al. |
| 2017/0080566 | A1 | 3/2017 | Stubbs et al. |
| 2017/0106532 | A1 | 4/2017 | Wellman et al. |
| 2017/0113885 | A1 | 4/2017 | Criswell |
| 2017/0121134 | A1 | 5/2017 | Girtman et al. |
| 2017/0157648 | A1 | 6/2017 | Wagner et al. |
| 2017/0305694 | A1 | 10/2017 | McMurrough et al. |
| 2017/0312789 | A1 | 11/2017 | Schroader |
| 2017/0349385 | A1 | 12/2017 | Moroni et al. |
| 2018/0072517 | A1 | 3/2018 | Girtman et al. |
| 2018/0111765 | A1 | 4/2018 | Wicks et al. |
| 2018/0111769 | A1 | 4/2018 | Yuvaraj et al. |
| 2018/0134501 | A1 | 5/2018 | Ge et al. |
| 2018/0148279 | A1 | 5/2018 | Criswell |
| 2018/0194574 | A1 | 7/2018 | Wagner et al. |
| 2018/0290845 | A1 | 10/2018 | McMurrough et al. |
| 2018/0297786 | A1 | 10/2018 | Clucas et al. |
| 2018/0334339 | A1 | 11/2018 | Criswell |
| 2018/0346264 | A9 | 12/2018 | Girtman et al. |
| 2018/0362270 | A1 | 12/2018 | Clucas et al. |

(56) References Cited

U.S. PATENT DOCUMENTS

| | | | |
|---|---|---|---|
| 2019/0084769 | A1 | 3/2019 | Clucas et al. |
| 2019/0262994 | A1 | 8/2019 | Yuvaraj |
| 2019/0315582 | A1 | 10/2019 | Criswell |
| 2019/0370511 | A1 | 12/2019 | Hamer et al. |
| 2020/0010288 | A1 | 1/2020 | McMurrough et al. |
| 2020/0039747 | A1 | 2/2020 | Ahmann et al. |
| 2020/0148488 | A1* | 5/2020 | Stenson .............. B65G 69/003 |
| 2020/0171650 | A1 | 6/2020 | Hallock et al. |
| 2020/0223066 | A1 | 7/2020 | Diankov et al. |
| 2020/0234071 | A1 | 7/2020 | Yuvaraj et al. |
| 2020/0270076 | A1 | 8/2020 | Geyer et al. |
| 2020/0276713 | A1 | 9/2020 | Zhang et al. |
| 2020/0324986 | A1 | 10/2020 | McMurrough et al. |
| 2021/0122589 | A1 | 4/2021 | Griggs |
| 2021/0171295 | A1 | 6/2021 | Azuma et al. |
| 2021/0171297 | A1* | 6/2021 | Stenson .............. B65G 69/003 |
| 2021/0198090 | A1 | 7/2021 | Bando et al. |
| 2021/0237986 | A1 | 8/2021 | Wagner et al. |
| 2021/0363770 | A1 | 11/2021 | Lindbo et al. |
| 2022/0041383 | A1 | 2/2022 | Krishnamoorthy et al. |
| 2022/0080584 | A1 | 3/2022 | Wicks et al. |
| 2022/0097243 | A1 | 3/2022 | Makhal et al. |
| 2022/0144561 | A1 | 5/2022 | Geyer et al. |
| 2022/0185602 | A1* | 6/2022 | Stenson ................ B65G 67/54 |
| 2023/0105141 | A1 | 4/2023 | Allen et al. |
| 2023/0106572 | A1* | 4/2023 | Allen ................. B65G 47/918 700/225 |
| 2023/0134924 | A1 | 5/2023 | Sun et al. |
| 2023/0150137 | A1 | 5/2023 | Sun et al. |
| 2023/0158676 | A1 | 5/2023 | Sun et al. |
| 2023/0271323 | A1 | 8/2023 | Sun et al. |
| 2023/0271797 | A1 | 8/2023 | Sun et al. |

FOREIGN PATENT DOCUMENTS

| | | |
|---|---|---|
| CN | 104743367 A | 7/2015 |
| CN | 105905019 A | 8/2016 |
| CN | 205500186 U | 8/2016 |
| CN | 106167180 A | 11/2016 |
| CN | 106629098 A | 5/2017 |
| CN | 209684850 U | 11/2019 |
| DE | 19510392 A1 | 9/1996 |
| DE | 102004001181 A1 | 8/2005 |
| DE | 102007023909 A1 | 11/2008 |
| DE | 102007024670 A1 | 12/2008 |
| DE | 102010033115 A1 | 2/2012 |
| DE | 102011083095 A1 | 3/2013 |
| DE | 102014111396 A1 | 2/2016 |
| EP | 0235488 A1 | 9/1987 |
| EP | 0613841 A1 | 9/1994 |
| EP | 0767113 A2 | 4/1997 |
| EP | 1223129 A1 | 7/2002 |
| EP | 1695927 A2 | 8/2006 |
| EP | 1995192 A2 | 11/2008 |
| EP | 2055654 A1 | 5/2009 |
| EP | 2152617 B1 | 10/2011 |
| EP | 2500150 A2 | 9/2012 |
| EP | 2650237 A1 | 10/2013 |
| EP | 2745982 A2 | 6/2014 |
| EP | 2665666 B1 * | 12/2014 ............. B65G 67/08 |
| EP | 2937299 A1 | 10/2015 |
| EP | 3006379 A2 | 4/2016 |
| EP | 3112295 A1 | 1/2017 |
| EP | 3623324 A1 | 3/2020 |
| FR | 1457450 A | 1/1966 |
| FR | 2832654 A1 | 5/2003 |
| GB | 2084531 A | 4/1982 |
| GB | 2507707 A | 5/2014 |
| JP | S54131278 A | 10/1979 |
| JP | S63310406 A | 12/1982 |
| JP | H0395001 A | 4/1991 |
| JP | H08157016 A | 6/1996 |
| JP | H05324662 B2 | 10/2001 |
| JP | 2002028577 A | 1/2002 |
| JP | 2003150230 A | 5/2003 |
| JP | 2007182286 A | 7/2007 |
| JP | 2008080300 A | 4/2008 |
| JP | 2010202291 A | 9/2010 |
| JP | 2014141313 A | 8/2014 |
| KR | 20160057668 A | 5/2016 |
| KR | 101710104 B1 | 3/2017 |
| WO | 03095339 A1 | 11/2003 |
| WO | 2007009136 A1 | 1/2007 |
| WO | 2008145223 A1 | 12/2008 |
| WO | 2010017872 A1 | 2/2010 |
| WO | 2010034044 A1 | 4/2010 |
| WO | 2011038442 A2 | 4/2011 |
| WO | 2011128384 A1 | 10/2011 |
| WO | 2012024714 A2 | 3/2012 |
| WO | 2012127102 A9 | 9/2012 |
| WO | 2014064592 A2 | 5/2014 |
| WO | 2014111483 A1 | 7/2014 |
| WO | 2015035300 A1 | 3/2015 |
| WO | 2015118171 A1 | 8/2015 |
| WO | 2015162390 A1 | 10/2015 |
| WO | 2016198565 A1 | 12/2016 |

OTHER PUBLICATIONS

Annex to Form PCT/ISA/206 (Partial Search) issued by the International Searching Authority (the European Patent Office) in related international application No. PCT/US2022/045943 on Jan. 30, 2023.

Cipolla etal., "Visually Guided Grasping in Unstructured Environments," Journal of Robotics and Autonomous Systems, vol. 19, No. 3-4, Mar. 1, 1997, pp. 337-346.

Communication pursuant to Article 94(3) EPC issued by the European Patent Office in related European Patent Application No. 17826628.4 on Aug. 31, 2022, 7 pages.

Communication pursuant to Rules 161(1) and 162 EPC issued by the European Patent Office on Jul. 16, 2019 in related European Patent Application No. 17826628.4, 3 pages.

Decision on Rejection issued by the China National Intellectual Property Administration, P.R.C in related Chinese Patent Application No. 201780075644.9 on Jun. 23, 2021, 23 pages.

Examiner's Report issued by the Innovation, Science and Economic Development Canada (Canadian Intellectual Property Office) in related Canadian Patent Application No. 3,139,261 on May 18, 2023, 4 pages.

Examiner's Report issued by the Innovation, Sciences and Economic Development Canada in related Canadian Patent Application No. 3,046,214 on May 25, 2020, 4 pages.

Examiner's Report issued by the Innovation, Sciences and Economic Development Canada in related Canadian Patent Application No. 3,046,214 on Jan. 12, 2021, 4 pages.

Final Office Action issued by the U.S. Patent and Trademark Office in related U.S. Appl. No. 15/835,764 on Jun. 11, 2019, 13 pages.

First Office Action, along with its English translation, issued by the National Intellectual Property Administration, P.R.C in related Chinese Patent Application No. 201780075644.9 on May 20, 2020, 11 pages.

International Preliminary Report on Patentability issued by the International Searching Authority, the European Patent Office, in related International Patent Application PCT/US2017/065264 mailed Jun. 11, 2019, 9 pgs.

International Search Report and Written Opinion issued by the International Searching Authority, the European Patent Office, in related International Patent Application PCT/US2017/065264 mailed Mar. 19, 2018, 12 pgs.

Klingbeil et al., "Grasping with Application to an Autonomous Checkout Robot," Journal of Robotics and Automation (ICRA), 2011 IEEE, May 9, 2011, pp. 2837-2844.

Non-Final Office Action issued by the U.S. Patent and Trademark Office in related U.S. Appl. No. 15/835,764 on Sep. 16, 2019, 8 pages.

Non-Final Office Action issued by the United States Patent and Trademark Office in related U.S. Appl. No. 16/776,197 on Sep. 29, 2020, 13 pages.

(56) References Cited

OTHER PUBLICATIONS

Non-Final Office Action issued by the United States Patent and Trademark Office in related U.S. Appl. No. 17/236,252 on Mar. 10, 2023, 14 pages.

Non-Final Office Action issued by the United States Patent and Trademark Office in related U.S. Appl. No. 17/953,982 on Jul. 3, 2023, 6 pages.

Non-Final Office Action issued in related U.S. Appl. No. 15/835,764 on Nov. 20, 2018, 10 pages.

Notification of Transmittal of the International Search Report and the Written Opinion of the International Searching Authority and the International Search Report and Written Opinion issued by the International Searching Authority (the European Patent Office) in related international application No. PCT/US2022/044927 on Jan. 27, 2023, 15 pages.

Notification of Transmittal of the International Search Report and the Written Opinion of the International Searching Authority and the International Search Report and Written Opinion issued by the International Searching Authority (the European Patent Office) in related international application No. PCT/US2022/045947 on Feb. 1, 2023, 17 pages.

Notification of Transmittal of the International Search Report and the Written Opinion of the International Searching Authority and the International Search Report and Written Opinion issued by the International Searching Authority (the European Patent Office) in related international application No. PCT/US2022/045671 on Mar. 21, 2023, 24 pages.

Notification of Transmittal of the International Search Report and the Written Opinion of the International Searching Authority and the International Search Report and Written Opinion issued by the International Searching Authority (the European Patent Office) in related international application No. PCT/US2022/045943 on Mar. 21, 2023, 23 pages.

Second Office Action, along with its English translation, issued by the National Intellectual Property Administration, P.R.C in related Chinese Patent Application No. 201780075644.9 on Jan. 6, 2021, 26 pages.

\* cited by examiner

DYNAMIC PROCESSING OF OBJECTS PROVIDED IN ELEVATED VEHICLES WITH EVACUATION SYSTEMS AND METHODS FOR RECEIVING OBJECTS

PRIORITY

The present application is a continuation of U.S. patent application Ser. No. 17/953,982, filed Sep. 27, 2022, now U.S. Pat. No. 11,866,269, issued Jan. 9, 2024, which claims priority to U.S. Provisional Patent Application Ser. No. 63/252,812, filed Oct. 6, 2021, the disclosures of which are hereby incorporated by reference in their entireties.

BACKGROUND

The invention generally relates to automated, robotic and other object processing systems such as sortation systems and relates in particular to automated and robotic systems intended for use in environments requiring, for example, that a variety of objects (e.g., parcels, packages, and articles, etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example, many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed, but such systems still require that objects be first removed from a vehicle for processing if they arrive by vehicle.

Such systems do not therefore, adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources, and there is further a need therefore for systems to unload vehicles and efficiently and effectively provide an ordered stream of objects from the trailer of the tractor trailer.

SUMMARY

In accordance with an aspect, the invention provides a system for receiving a plurality of objects from an elevated trailer of a tractor trailer. The system includes a collection conveyor extending between a base end and a coupled end, the coupled end being rotatably coupled to an evacuation conveyor, said collection conveyor including an object facing surface between the base end and the coupled end for receiving the plurality of objects, said collection conveyor being rotatably adjustable with respect to the evacuation conveyor at the coupled end, and both the evacuation conveyor and the coupled end of the collection conveyor being elevationally adjustable.

In accordance with another aspect, the system includes a collection conveyor extending between a base end and a coupled end, the collection conveyor being adapted to retain the plurality of objects within the tractor trailer when the collection conveyor is in a first position with respect to the tractor trailer, and to permit the plurality of objects to travel up the collection conveyor when the collection conveyor is in a second position with respect to the tractor trailer.

In accordance with a further aspect, the invention provides a method of receiving a plurality of objects from an elevated trailer of a tractor trailer. The method includes urging a collection conveyor against the plurality of objects in the trailer from a rear of the trailer, providing the elevated trailer such that the rear of the trailer is lower than a front of the trailer, retaining the plurality of objects within the trailer with the collection conveyor, lowering an upper portion of the collection conveyor, and permitting the plurality of objects to move upward along the collection conveyor to an evacuation conveyor.

In accordance with yet a further aspect, the invention provides a system for emptying contents of a trailer of a tractor trailer. The system includes an elevation system for elevating a front end of the trailer with respect to a rear end of the trailer, a collection conveyor for receiving objects from the elevated trailer and for controlling a rate of removal of objects from the elevated trailer, and an evacuation conveyor pivotally coupled to the collection conveyor for receiving the objects from the collection conveyor.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
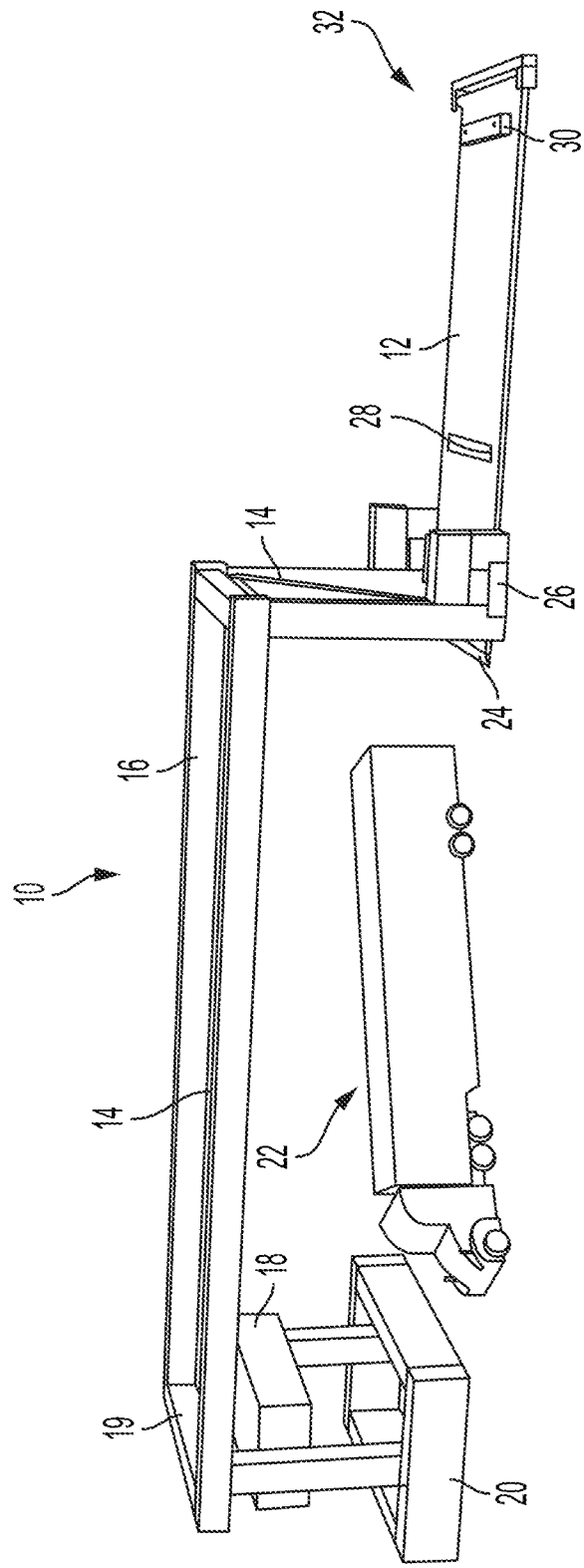
FIG. 1 shows an illustrative diagrammatic view of a system for elevating a trailer of a tractor trailer in accordance with an aspect of the present invention.

In accordance with various aspects, the invention provides a processing system in which a plurality of objects are received from an elevated trailer of a tractor trailer. With reference to FIG. 1, the system includes a vehicle elevation system 10 that includes a vehicle lift plate 12 attached at a first end via cables 14 over a frame 16 to a large counterweight 18. The cables 14 travel through a movement control system 19 that may control (e.g., stop, slow or actively power) movement of the cables 14. In cooperation with the counterweight 18, the control system 19 controls the lifting and lowering of the trailer. In accordance with various embodiments, the system may be designed to lift either a trailer alone (decoupled from the tractor and using a smaller counterweight) or both the tractor and trailer as shown. A protective barrier 20 is provided around the area below the counterweight 18, and the frame 16 is sufficiently large to accommodate the movement and positioning of a tractor trailer vehicle 22 below the frame 16. A small vehicle ramp 24 and lift stop blocks 26 are provided at the first end of the vehicle lift plate 12. The lift stop blocks 26 remain engaged until the system is ready to lift the vehicle as discussed below. The vehicle lift plate 12 also includes a front wheel chock block receiving area 28 for receiving a front wheel chock block and includes a fixed rear wheel chock block 30. The vehicle lift plate 12 is attached at a second end that is opposite the first end to a lift plate pivot system 32.

Figure 2:
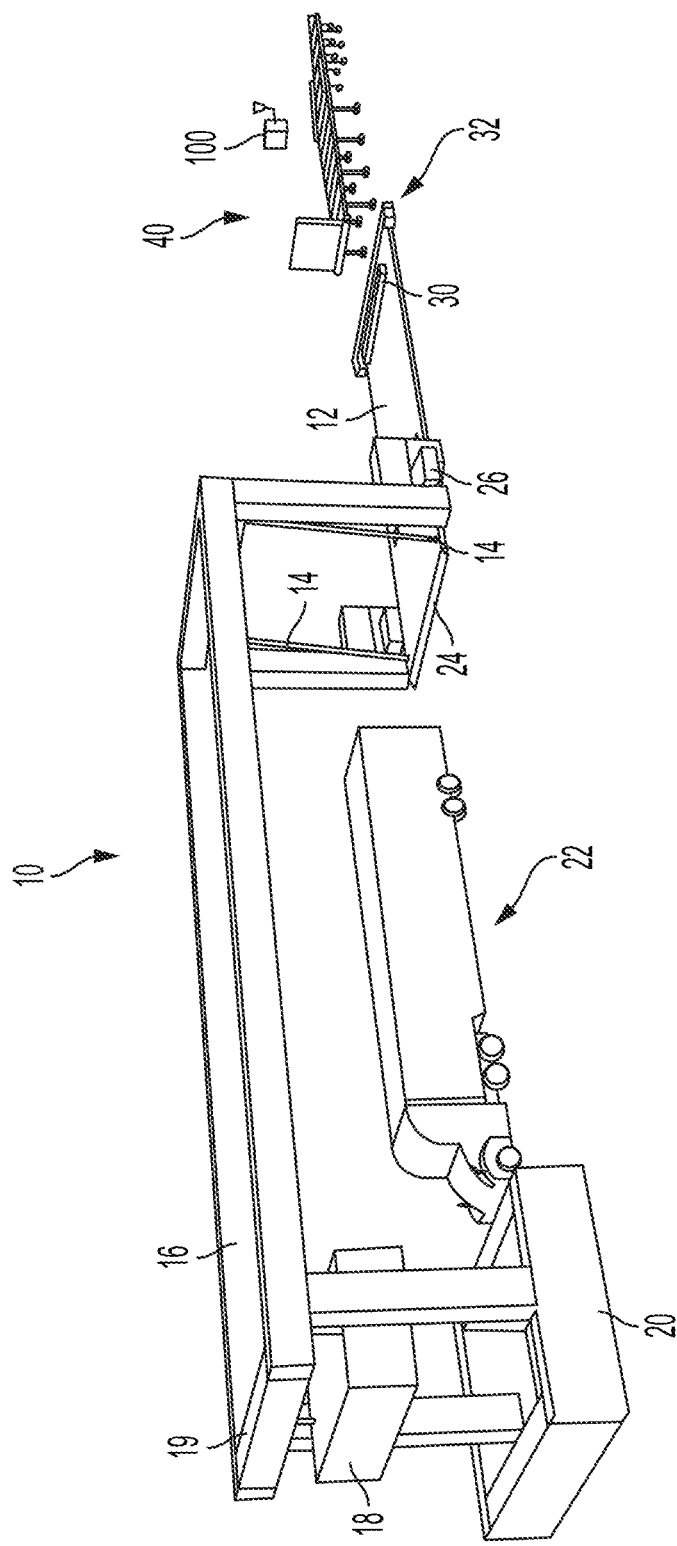
FIG. 2 shows an illustrative diagrammatic view of the system of FIG. 1 additionally showing an object collection system in accordance with a further aspect of the present invention.
Figure 3:
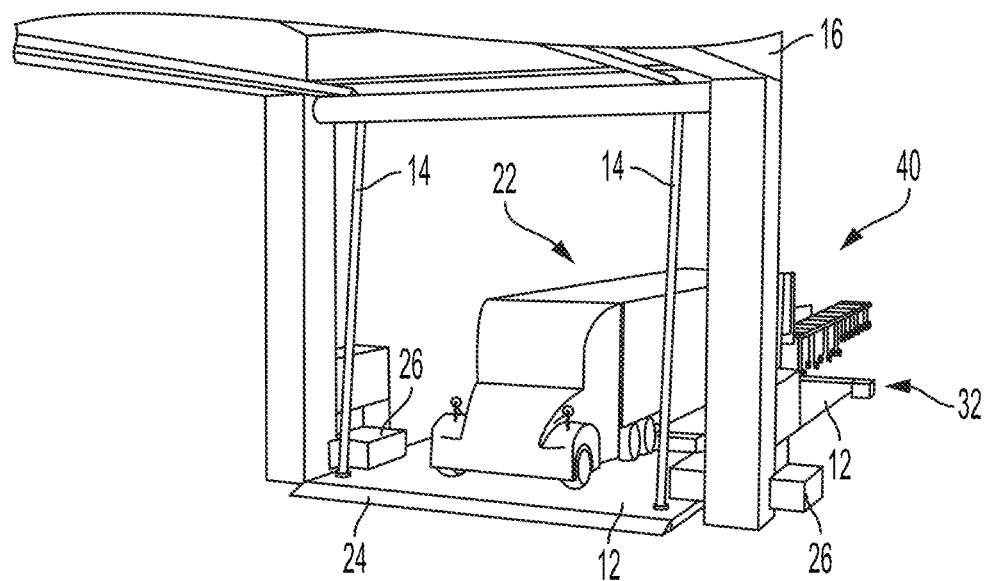
FIG. 3 shows an illustrative diagrammatic front view of a tractor trailer in an elevation station in accordance with an aspect of the present invention.
Figure 4:
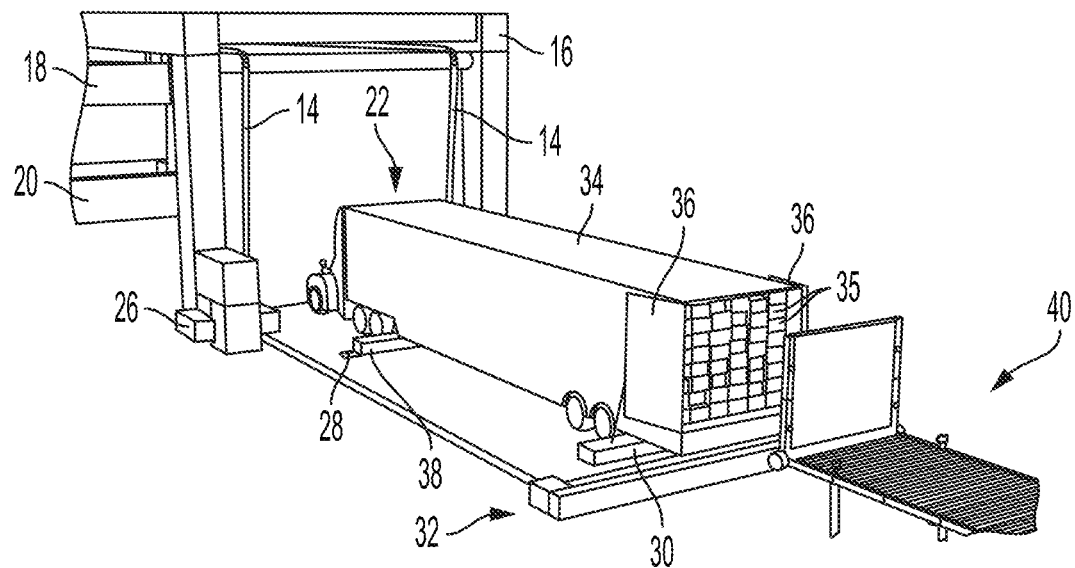
FIG. 4 shows an illustrative diagrammatic rear view of the tractor trailer of FIG. 3 showing a portion of the evacuation system in accordance with an aspect of the present invention.

With further reference to FIG. 2, the tractor trailer vehicle 22 is positioned to be pulled forward toward the protective barrier 20 such that it may be backed up through an opposite end of the frame 16 onto the vehicle lift plate 12. An evacuation system 40 is also provided for receiving a plurality of objects as discussed in more detail below, and the operation of the systems described herein may be controlled (e.g., wirelessly or by a wired network) by one or more computer processing systems 100. The tractor trailer vehicle 22 may be backed up over the ramp 24 onto the vehicle lift plate 12 as shown in FIG. 3. A front wheel chock block 38 is then placed in the block receiving area 28 behind the tractor as further shown in FIG. 4, and the rear doors 36 of the trailer 34 are fastened open, exposing the objects 35 within the trailer 34.

Figure 5:
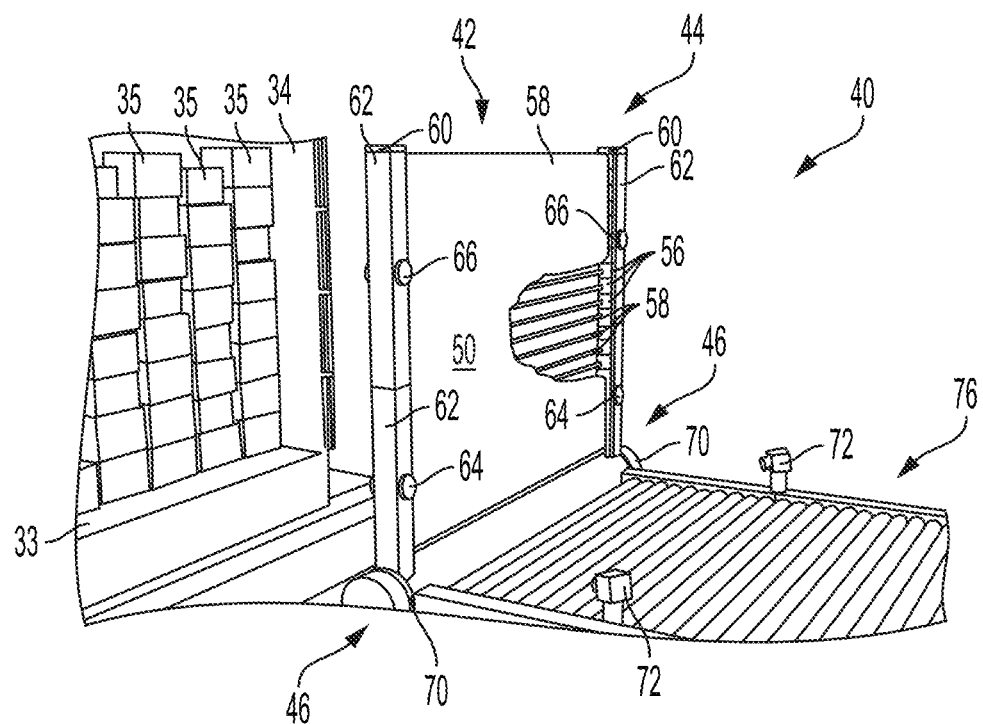
FIG. 5 shows an illustrative diagrammatic enlarged view of an engagement side of a collection conveyor of the evacuation system of FIG. 2.
Figure 6:
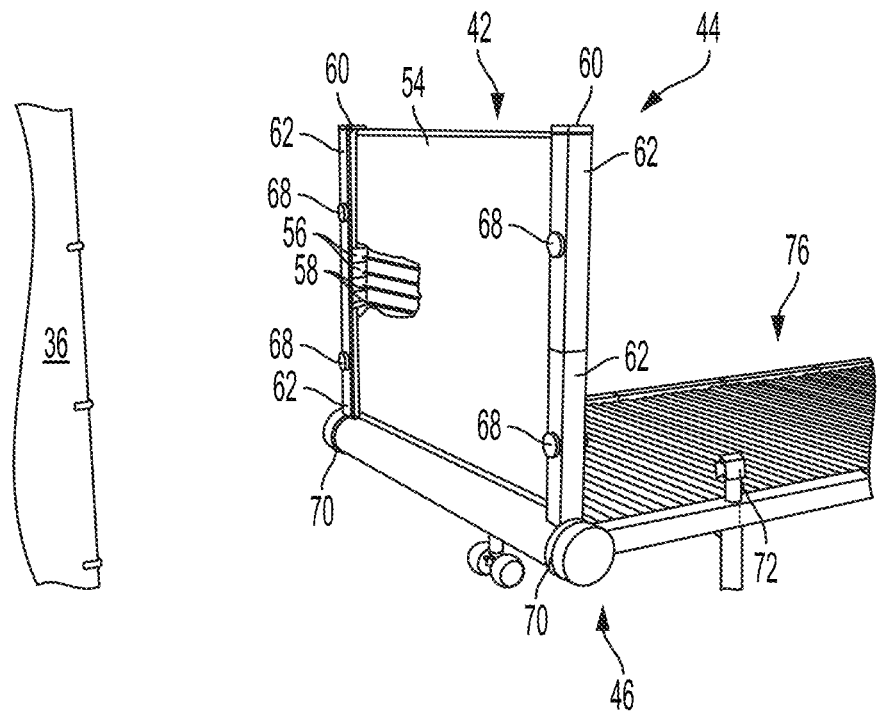
FIG. 6 shows an illustrative diagrammatic view of the back side of the collection conveyor of FIG. 5.

The system 40 includes a collection conveyor 42 with a base end 44 and a coupled end 46 that is rotationally coupled to an evacuation conveyor 76 as shown in FIGS. 5 and 6. The collection conveyor 42 of FIGS. 5 and 6 includes a conveyor belt 50 providing an object facing surface 52 and a backside surface 54. The collection conveyor 42 also includes force detection units 56 on either vertical side of the collection conveyor 42, with force transfer beams 58 extending between pairs of force detection units 56 inside the belt 50. The rollers (e.g., one or both of which are actively powered) at the ends (base end and coupled end) that provide the belt conveyor movement are also mounted on force detection units 56.

The collection conveyor 42 includes a pair of magnets 60 (e.g., permanent magnets or selectively controlled electromagnets) at the base end of the collection conveyor 42. The magnets 60 are provided on side beams 62 and the magnets 60 facilitate positioning of the collection conveyor within the trailer as discussed in more detail below. The side beams also include upper perception units 64 and lower perception units 66 on the object facing side of the collection conveyor 42, as well as assessment perception units 68 on the backside of the collection conveyor 42 that is opposite the collection side. The assessment perception units 68 facilitate assessment of a load of objects within a trailer prior to engagement and assist in guiding the system 40 toward the end of a trailer. The upper trailer engagement perception units 64 assist in monitoring locations and positions of objects in an upper area of the trailer, while the lower trailer engagement perception units 66 assist in monitoring locations and positions of objects in a lower area of the trailer. The force transfer beams 58 facilitate monitoring a load on the collection conveyor 42 (e.g., on the object facing side thereof) during engagement with a trailer. The belt 50 runs over the outer surfaces of the force transfer beams 58 and transfer a force thereon directed to the force detection units 56.

The collection conveyor 42 is pivotally mounted to the evacuation conveyor 76 at the coupled end 46 that includes a pivot coupling mounted on force torque sensors 70 for detecting any forces acting on the pivot coupling. The evacuation conveyor 76 (e.g., a roller conveyor as shown or a belt conveyor) includes one or more evacuation conveyor engagement perception units 72 for perceiving data regarding any visible regions within the trailer (depending on a position of the collection conveyor) as well as data regarding objects being moved onto the evacuation conveyor 46 from the collection conveyor 42.

The system therefore includes a collection conveyor extending between a base end and a coupled end, the coupled end being rotatably coupled to an evacuation conveyor in accordance with an aspect of the invention. The collection conveyor includes an object facing surface between the base end and the coupled end for receiving the plurality of objects. The collection conveyor is rotatably adjustable with respect to the evacuation conveyor at the coupled end, and both the evacuation conveyor and the coupled end of the collection conveyor are elevationally adjustable.

Figure 7:
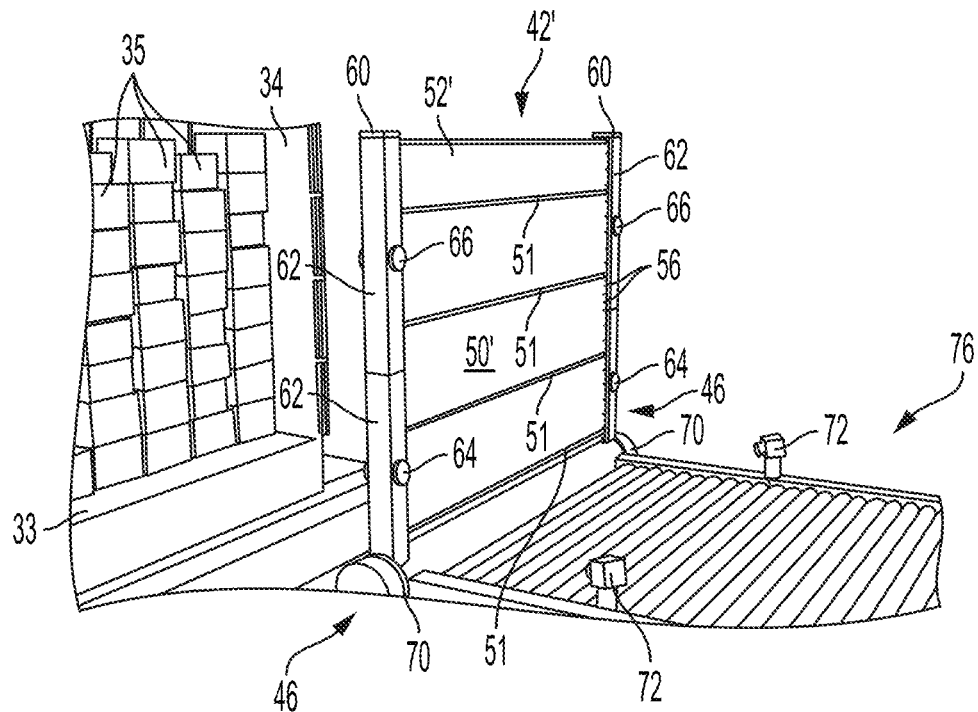
FIG. 7 shows an illustrative diagrammatic enlarged view of an engagement side of a collection conveyor that includes cleats in accordance with an aspect of the present invention.

With reference to FIG. 7, in accordance with another aspect of the present invention, the system 40 includes a collection conveyor 42' with a conveyor belt 50' that includes cleats 51 (a cleated conveyor). The collection conveyor 42' similarly includes base end 44 and a coupled end 46 that is rotationally coupled to an evacuation conveyor 76, as well as an object facing surface 52' and a backside surface. The collection conveyor 42' also similarly includes force detection units 56 on either vertical side of the collection conveyor 42', with force transfer beams 58 extending between pairs of force detection units 56 inside the cleated belt 50'. Again, the rollers (e.g., one or both of which are actively powered) at the ends (base end and coupled end) that provide the belt conveyor movement are also mounted on force detection units 56.

The collection conveyor 42' similarly includes a pair of magnets 60 (e.g., permanent magnets or selectively controlled electromagnets) at the base end of the collection conveyor 42'. The magnets 60 are provided on side beams 62 and facilitate positioning of the collection conveyor within the trailer. The side beams also include upper perception units 64 and lower perception units 66 on the object facing side of the collection conveyor 42', as well as assessment perception units 68 on the backside of the collection conveyor 42' that is opposite the collection side. The assessment perception units 68 facilitate assessment of a load of objects within a trailer prior to engagement and assist in guiding the system 40 toward the end of a trailer. The upper trailer engagement perception units 64 assist in monitoring locations and positions of objects in an upper area of the trailer, while the lower trailer engagement perception units 66 assist in monitoring locations and positions of objects in a lower area of the trailer. The force transfer beams 58 facilitate monitoring a load on the collection conveyor 42' (e.g., on the object facing side thereof) during engagement with objects within a trailer. The conveyor belt 50' runs over the outer surfaces of the force transfer beams 58 and transfer a force thereon directed to the force detection units 56.

Figure 8:
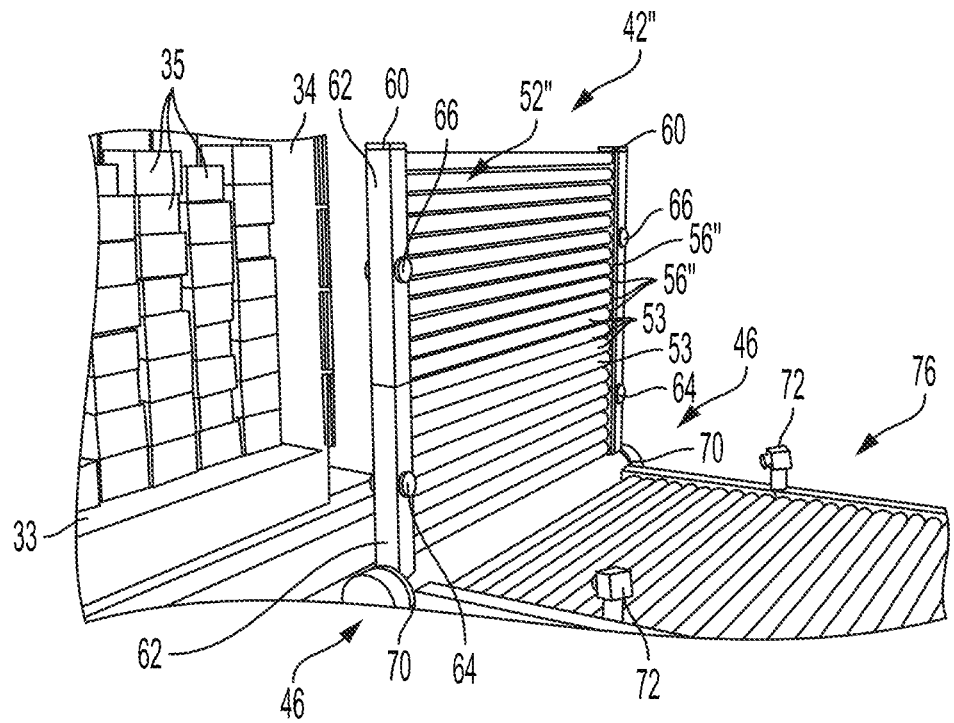
FIG. 8 shows an illustrative diagrammatic enlarged view of an engagement side of a collection conveyor that includes rollers in accordance with a further aspect of the present invention.

In accordance with another aspect of the present invention, the system 40 includes a collection conveyor 42" with a plurality of rollers 53 as shown in FIG. 8. The collection conveyor 42" similarly includes base end 44 and a coupled end 46 that is rotationally coupled to an evacuation conveyor 76, as well as an object facing surface 52" and a backside surface. The collection conveyor 42" also similarly includes force detection units 56" on either side of the rollers 53 (on which the rollers are mounted).

The collection conveyor 42" similarly includes a pair of magnets 60 (e.g., permanent magnets of selectively controlled electromagnets) at the base end of the collection conveyor 42". The magnets 60 are provided on side beams 62 to facilitate positioning within the trailer. The side beams also include upper perception units 64 and lower perception units 66 on the object facing side of the collection conveyor 42", as well as assessment perception units 68 on the backside of the collection conveyor 42" that is opposite the collection side. The assessment perception units 68, the upper trailer engagement perception units 64, and the lower trailer engagement perception units 66 function as discussed above.

Again, the collection conveyor 42', 42" is pivotally mounted to the evacuation conveyor 46 at the coupled end 46 that includes a pivot coupling mounted on force torque sensors 70 for detecting any forces acting on the pivot coupling. The evacuation conveyor 76 (e.g., a roller conveyor as shown or a belt conveyor) includes one or more evacuation conveyor engagement perception units 72 for perceiving data regarding any visible regions within the trailer (depending on a position of the collection conveyor) as well as data regarding objects being moved onto the evacuation conveyor 46 from the collection conveyor 42', 42". As discussed in more detail herein, the collection conveyors 42' and 42" may be used with any of the systems discussed herein with reference to collection conveyor 42.

Figure 9:
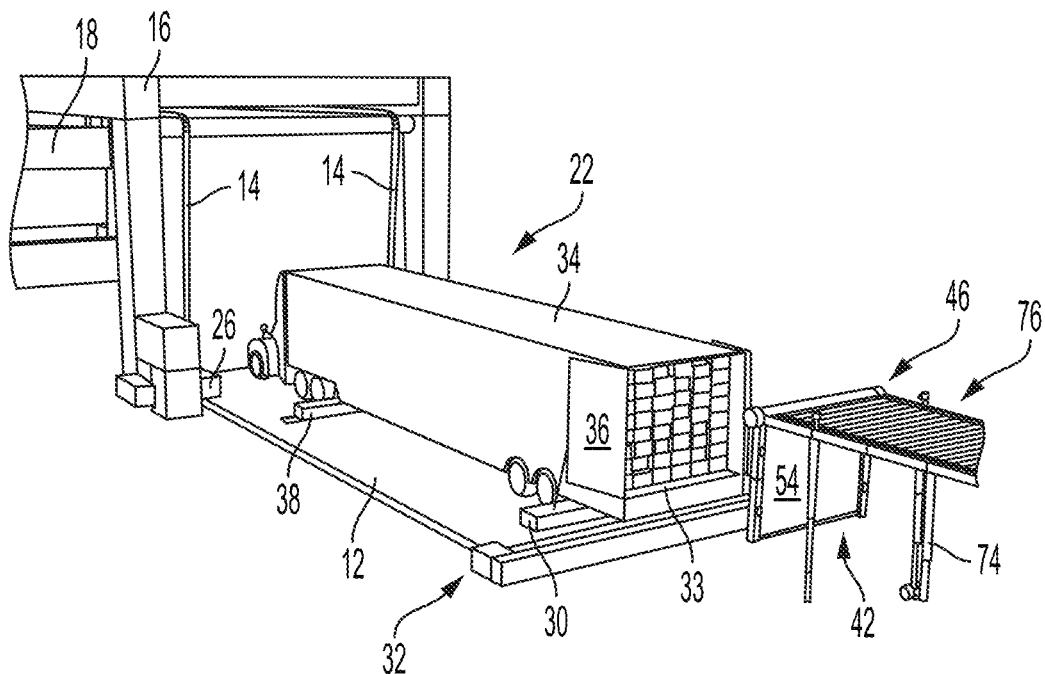
FIG. 9 shows an illustrative diagrammatic view of the evacuation system of FIG. 2 prior to engagement with the trailer of the tractor trailer.
Figure 10:
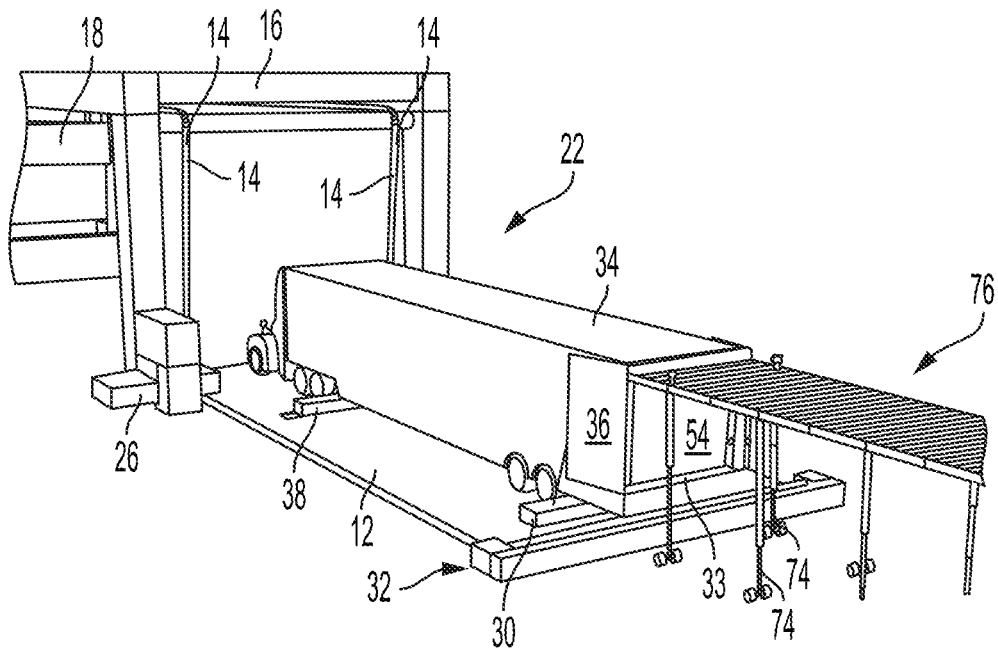
FIG. 10 shows an illustrative diagrammatic view of the evacuation system of FIG. 2 upon engagement with the trailer of the tractor trailer.

With reference to FIG. 9, the evacuation conveyor 76 is supported by extendable support legs 74 (mounted on wheels). The evacuation conveyor 46 is then elevated (on the extendable support legs 74) such that it is close to the elevation of the top of the trailer 34 of the tractor trailer vehicle 22. The collection conveyor 72 is then rotated about the coupled end 46 pivot mounting with respect to the evacuation conveyor 76 such that the object facing surface faces the objects 35 in the trailer 34, and the backside 54 faces away from the trailer 34. With further reference to FIG. 10, the system 40 is moved (on the support wheels) toward the trailer 34 of the tractor trailer vehicle 22 and engages the objects in the trailer on the object facing surface of the collection conveyor 42. The magnets 60 on the ends of the side beams 62 then engage the floor 33 of the inside of the trailer 34, preferably with the side beams 62 standing vertical on the floor, maximizing the contact surface between the magnets 60 and the floor 33. In the event that the trailer 34 is not full such that objects are directly engaged with the collection conveyor 42, the collection conveyor is still engaged with the floor of the interior of the trailer 34 near the end of the trailer (e.g., with the side beams 62 being perpendicular to the floor 33).

Figure 11:
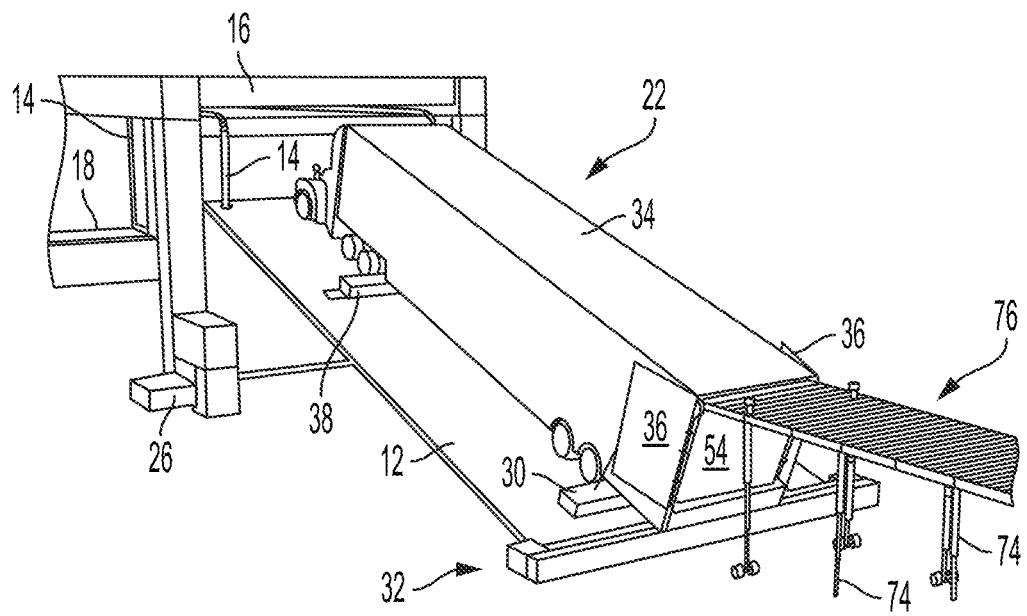
FIG. 11 shows an illustrative diagrammatic view of the evacuation system of FIG. 2 upon engagement with the trailer of the tractor trailer with the trailer elevated.
Figure 12:
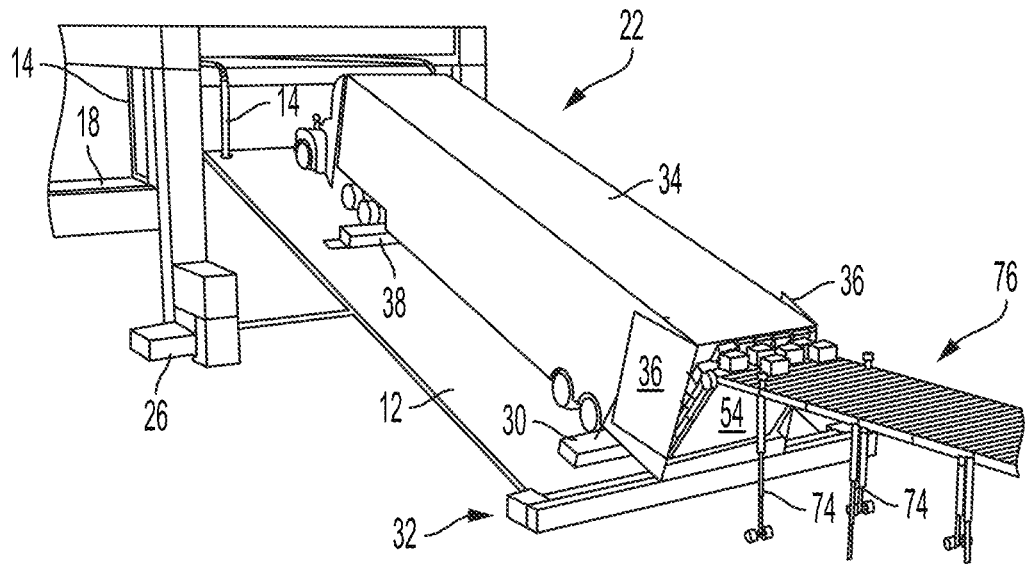
FIG. 12 shows an illustrative diagrammatic view of the evacuation system of FIG. 2 upon engagement with the trailer of the tractor trailer showing objects being evacuated from the elevated trailer.

Once the collection conveyor 42 is engaged within the trailer 42, the lift stop blocks 26 are disengaged from the vehicle lift plate 12 as shown in FIG. 10. The movement control system 19 (discussed above with reference to FIGS. 1 and 2) may then release a hold on movement of the cables, permitting the vehicle lift plate to be raised as shown in FIG. 11 with the tractor trailer vehicle 22 on the vehicle lift plate 12. The collection conveyor 42 adjusts as the tractor trailer vehicle 22 is being elevated (as discussed in more detail below), and the collection conveyor 42 holds the objects within the trailer 34 until the system is ready to unload the objects in a controlled fashion. To unload the objects, the system 40 moves the coupled end 46 of the collection conveyor (and the evacuation conveyor 76) a small distance away from the trailer 34 (as shown in FIG. 12), and eventually moves the coupled end 46 of the collection conveyor and the evacuation conveyor 76 lower toward the ground as objects are removed from the trailer.

Prior to lifting, the magnets 60 are engaged with the floor 33 of the inside of the trailer and the position of the evacuation conveyor 76 is adjusted to position the collection conveyor 42 to be approximately perpendicular to the floor 33 of the trailer 34. With the magnets seated against the floor of the trailer at the outset of the trailer lifting, the collection conveyor should have a reduced chance of sliding on the floor toward the end of the trailer. As the trailer is lifted, the base end of the collection conveyor may move away from the vertical position with respect to the trailer floor such that the collection conveyor 42 and the interior floor of the trailer should form an obtuse angle, facilitating maintaining the base of the collection conveyor within the trailer. Two points of rotation are therefore potentially at play.

Figure 13:
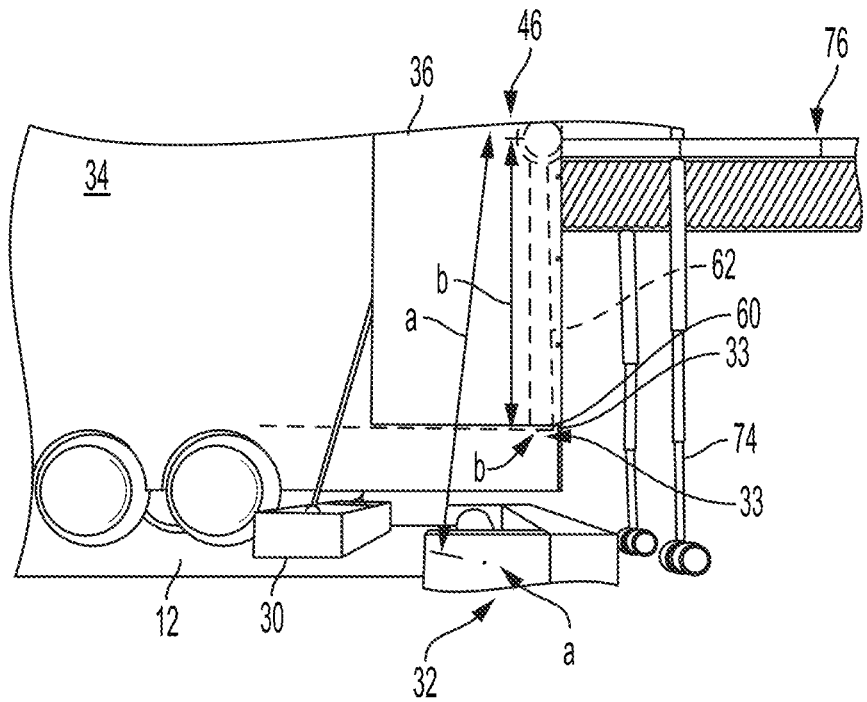
FIG. 13 shows an illustrative diagrammatic side view of the evacuation system of FIG. 4 upon engagement with the trailer of the tractor trailer.
Figure 14:
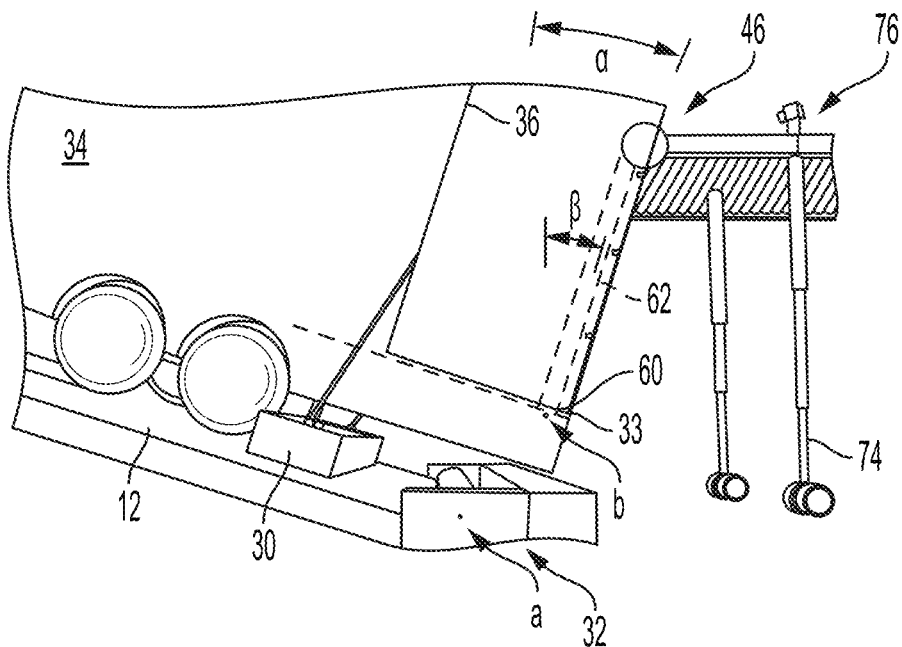
FIG. 14 shows an illustrative diagrammatic side view of the evacuation system of the evacuation system of FIG. 4 upon engagement with the trailer of the tractor trailer with the trailer elevated.

For example, FIG. 13 shows that the vehicle lift plate 12 (and the vehicle 22 including the trailer 34 thereon) will pivot about an axis (labelled a) within the lift plate pivot system 32. As the collection conveyor 42 pivots with respect to its base end 44 that includes the magnets 60, the collection conveyor 42 may pivot about an axis (labelled b) within the trailer 34. The coupled end 46 of the collection conveyor therefore may pivot about both axes a and b. The radius of the pivot with respect to axis a is shown at $r_a$ and the radius of the pivot with respect to axis b is shown at $r_b$ in FIG. 13. The potential angle of movement of the coupled end 46 with respect to axis a is shown as an angle $\alpha$ and the potential angle of movement of the coupled end 46 with respect to axis b is shown as an angle $\beta$ in FIG. 14. The resulting movement vector may be given by the chord equations $c_\alpha = 4r \sin(\alpha/2)$ and $c_\beta = 4r \sin(\beta/2)$, each including vertical components and horizontal components. Knowing these general values, the system may accommodate the lifting of the vehicle by moving the elevated conveyor 76 in both vertical and horizontal directions as the vehicle is lifted to ensure that the collection conveyor 42 remains properly positioned within the trailer. The force sensors 56 and 70 are also monitored to ensure that the collection conveyor is not receiving too much force against it from the objects within the trailer, and the perception units 62, 64, 66 and 72 are monitored to confirm that the anticipated movement occurs.

In accordance with certain aspects therefore, the invention provides a system for receiving a plurality of objects from an elevated trailer of a tractor trailer, and the system includes a collection conveyor extending between a base end and a coupled end. The collection conveyor is adapted to retain the plurality of objects within the tractor trailer when the collection conveyor is in a first position with respect to the tractor trailer, and to permit the plurality of objects to travel up the collection conveyor when the collection conveyor is in a second position with respect to the tractor trailer.

Figure 15:
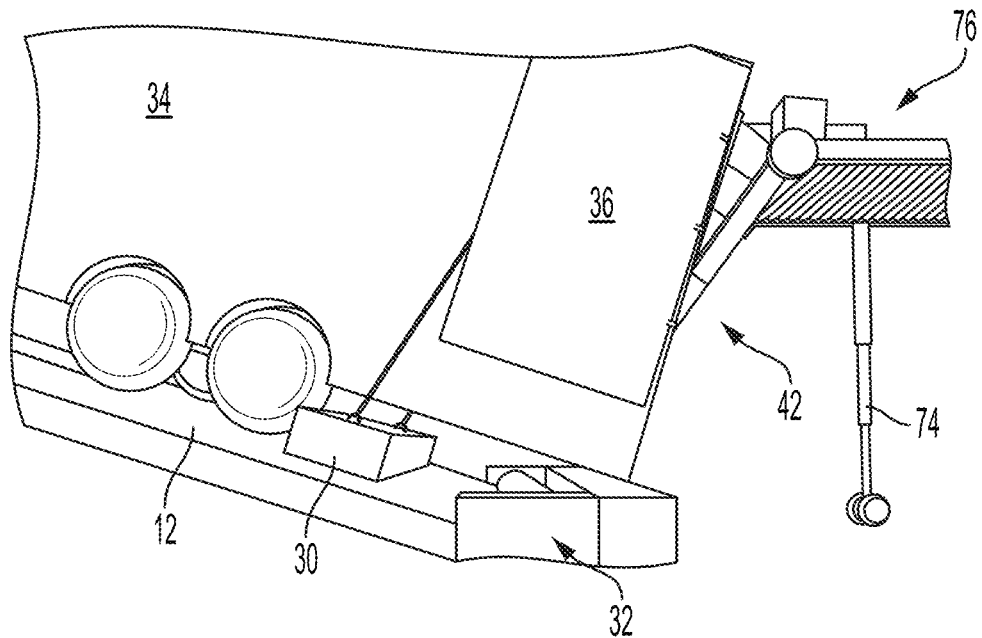
FIG. 15 shows an illustrative diagrammatic side view of the evacuation system of FIG. 4 upon engagement with the trailer of the tractor trailer showing objects being evacuated from the elevated trailer.
Figure 16:
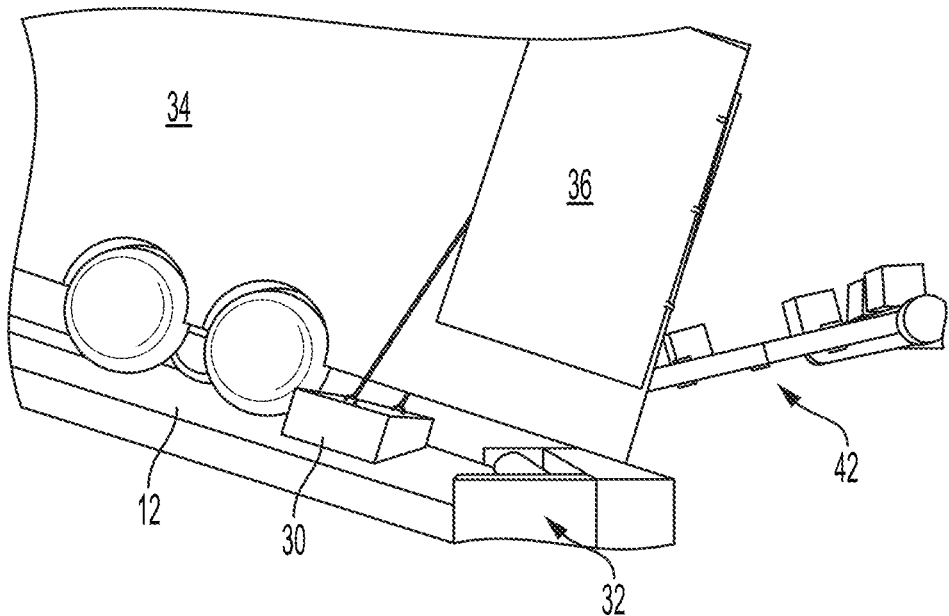
FIG. 16 shows an illustrative diagrammatic side view of the evacuation system of FIG. 4 upon engagement with the trailer of the tractor trailer showing objects being evacuated from the elevated trailer with the collection conveyor having been lowered as objects are removed from the trailer.
Figure 17:
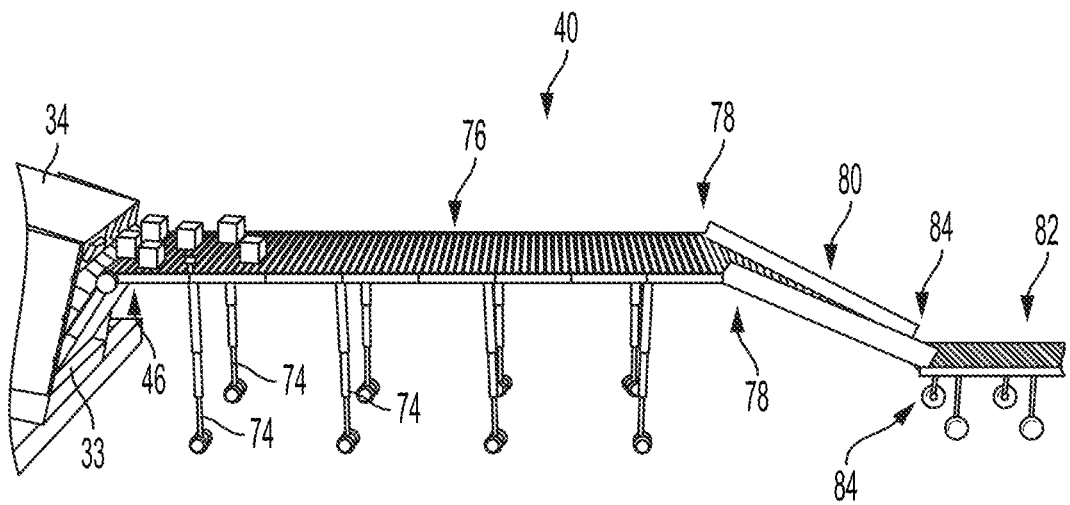
FIG. 17 shows an illustrative diagrammatic elevated side view of an evacuation conveyor of the evacuation system of FIG. 2.
Figure 18:
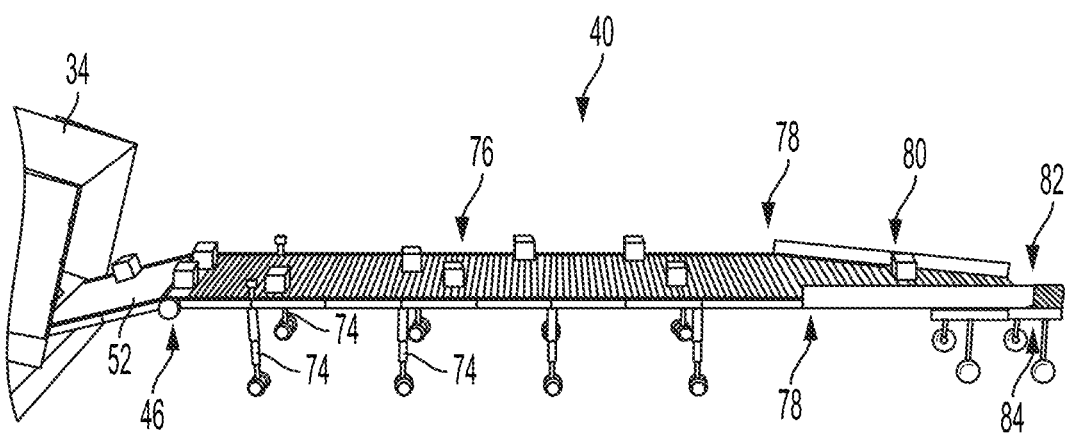
FIG. 18 shows an illustrative diagrammatic elevated side view of an evacuation conveyor of the evacuation system of FIG. 2 in an elevated position.

As the elevation of objects within the trailer is reduced, the coupled end 46 of the collection conveyor 42 is lowered to facilitate the removal of objects. FIG. 15 shows a side view of the collection conveyor 42 at an elevated position reviewing objects from a fully loaded trailer 34, while FIG. 16 shows the collection conveyor 42 at a lowered position reviewing objects from the trailer 34 when it is less loaded. The evacuation conveyor 76 includes the extendable support legs 74 as discussed above, as well as a ramp section 80 that is pivotally coupled to the evacuation conveyor 76 by a pivot coupling 78, as well as a dynamic engagement assembly 84 for dynamically engaging a facilities conveyor 82 as shown in FIG. 17. FIG. 17 shows the evacuation conveyor 76 at an elevated position facilitating removal of objects, and FIG. 18 shows the evacuation conveyor 76 (and the coupled end 46) at a lowered position while continuing to facilitate removal of objects from the trailer.

Figure 19:
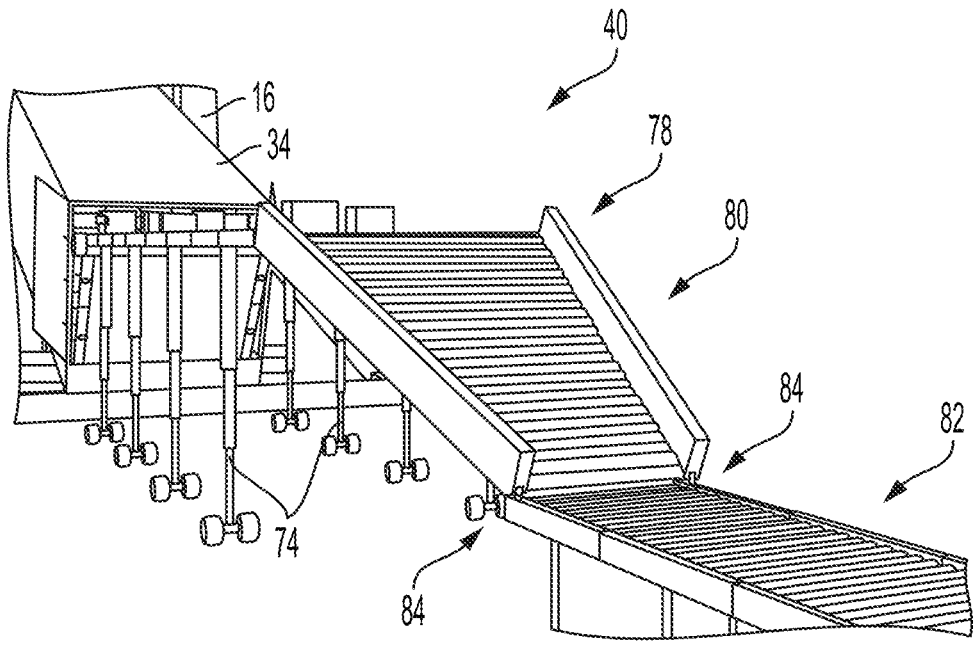
FIG. 19 shows an illustrative diagrammatic view of a ramp section of the evacuation system of FIG. 2 in an elevated position.
Figure 20:
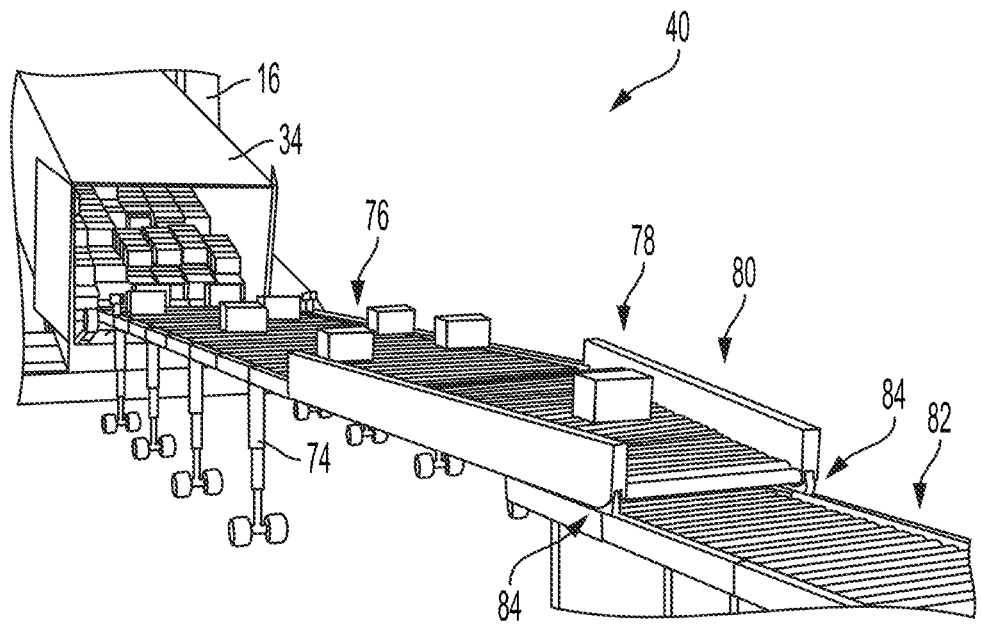
FIG. 20 shows an illustrative diagrammatic view of the ramp section of FIG. 19 in a lowered position.

With further reference to FIG. 19, the ramp section 80 that is pivotally coupled (passively) at 78 to the elevation conveyor 76. The evacuation system includes a ram section that has a tapered width, bringing the objects into a smaller width conveyance for the facilities conveyor 82. The ramp section 80 also includes a dynamic engagement system 82 that permits the lower end of the ramp section to travel along (e.g., by wheels in a track) the facilities conveyor 82. FIG. 19 shows the evacuation conveyor 76 elevated (with the upper end of the ramp section 80), and FIG. 20 shows the evacuation conveyor lowered, wherein the dynamic engagement system 82 provides that the ramp section travels along the facilities conveyor 82 to ensure that objects are deposited onto the facilities conveyor 82.

In accordance with further aspects therefore, the invention provides a method of receiving a plurality of objects from an elevated trailer of a tractor trailer. The method includes urging a collection conveyor against the plurality of objects in the trailer from a rear of the trailer, providing the elevated trailer such that the rear of the trailer is lower than a front of the trailer, retaining the plurality of objects within the trailer with the collection conveyor, lowering an upper portion of the collection conveyor, and permitting the plurality of objects to move upward along the collection conveyor to an evacuation conveyor, with further processing toward a facilities conveyor via a ramp section and dynamic engagement system.

The invention further provides in accordance with further aspects, a system for emptying contents of a trailer of a tractor trailer. The system includes an elevation system for elevating a front end of the trailer with respect to a rear end of the trailer, a collection conveyor for receiving objects from the elevated trailer and for controlling a rate of removal of objects from the elevated trailer, and an evacuation conveyor pivotally coupled to the collection conveyor for receiving the objects from the collection conveyor.

Those skilled in the art will appreciate that numerous modifications and variations may be made to the above disclosed embodiments without departing from the spirit and scope of the present invention.

What is claimed is:

1. A method of evacuating a trailer of a tractor trailer, said method comprising:
    moving a coupled end of a collection conveyor upward, said coupled end of the collection conveyor being coupled to an evacuation conveyor;
    rotating a base end of the collection conveyor the evacuation conveyor configured and operable to change elevation in a substantially horizontal orientation in a first rotational direction with respect to the coupled end of the collection conveyor such that a first surface of the collection conveyor faces a plurality of objects to be removed from the trailer of the tractor trailer;
    contacting the plurality of objects with the first surface of the collection conveyor; and
    activating the first surface of the collection conveyor to move the plurality of objects along the collection conveyor toward the evacuation conveyor.

2. The method of claim 1, wherein the method further includes rotating the base end of the collection conveyor in a second rotational direction with respect to the coupled end of the collection conveyor while the plurality of objects is being received by the collection conveyor, the second rotational direction being opposite the first rotational direction.

3. The method of claim 1, wherein the method further includes attaching the base end of the collection conveyor to an anchor area proximate a floor of the trailer and the rear of the tractor trailer.

4. The method of claim 1, wherein the method further includes detecting force against the collection conveyor and providing collection conveyor force data.

5. The method of claim 4, wherein the method further includes adjusting an elevation of the trailer of the tractor trailer responsive to the collection conveyor force data.

6. The method of claim 1, wherein the method further includes changing an elevation of the evacuation conveyor and the coupled end of the collection conveyor.

7. The method of claim 1, wherein the evacuation conveyor includes an elevation system that elevationally adjusts the evacuation conveyor together with the coupled end of the collection conveyor.

8. The method of claim 7, wherein the evacuation conveyor includes a ramp section that couples with a facilities conveyor, the ramp section providing an elevation drop to the facilities conveyor.

9. The method of claim 8, wherein the method further includes dynamically engaging the facilities conveyor with the ramp section using a dynamic engagement assembly as the evacuation conveyor is raised and lowered.

10. The method of claim 9, wherein the dynamic engagement assembly includes rollers, and wherein the ramp section includes a tapered width that narrows toward the facilities conveyor.

11. A method of evacuating a trailer of a tractor trailer, said method comprising:
coupling a coupled end of a collection conveyor to an evacuation conveyor, the evacuation conveyor configured and operable to change elevation in a substantially horizontal orientation;
rotating a base end of the collection conveyor in a first rotational direction with respect to the coupled end of the collection conveyor such that first surface of the collection conveyor faces a plurality of objects to be removed from the trailer of the tractor trailer;
contacting the plurality of objects with the first surface of the collection conveyor;
activating the first surface of the collection conveyor to move the plurality of objects along the collection conveyor toward the evacuation conveyor; and
rotating the base end of the collection conveyor in a second rotational direction with respect to the coupled end of the collection conveyor while the plurality of objects is being received by the collection conveyor, the second rotational direction being opposite the first rotational direction.

12. The method of claim 11, wherein the method further includes attaching the base end of the collection conveyor to an anchor area proximate a floor of the trailer and the rear of the tractor trailer.

13. The method of claim 11, wherein the method further includes detecting force against the collection conveyor and providing collection conveyor force data.

14. The method of claim 13, wherein the method further includes adjusting an elevation of the trailer of the tractor trailer responsive to the collection conveyor force data.

15. The method of claim 11, wherein the method further includes changing an elevation of the evacuation conveyor and the coupled end of the collection conveyor.

16. The method of claim 11, wherein the evacuation conveyor includes an elevation system that elevationally adjusts the evacuation conveyor together with the coupled end of the collection conveyor.

17. The method of claim 16, wherein the evacuation conveyor includes a ramp section that couples with a facilities conveyor, the ramp section providing an elevation drop to the facilities conveyor.

18. The method of claim 17, wherein the method further includes dynamically engaging the facilities conveyor with the ramp section using a dynamic engagement assembly as the evacuation conveyor is raised and lowered.

19. The method of claim 18, wherein the dynamic engagement assembly includes rollers, and wherein the ramp section includes a tapered width that narrows toward the facilities conveyor.

20. A trailer unloading system for unloading a plurality of objects from a trailer of a tractor trailer, said trailer unloading system comprising:
a collection conveyor including a base end and an opposite coupling end, the coupling end for pivotally coupling to an evacuation conveyor, the collection conveyor including a first surface on which objects are to be transported to the evacuation conveyor;
an elevation system that permits both the evacuation conveyor to elevate in a substantially horizontal orientation and the coupling end of the collection conveyor to be elevated relative the base end of the collection conveyor such that the first surface of the collection conveyor faces the plurality of objects in the trailer of the tractor trailer; and
an activation system for activating the collection conveyor to move the plurality of objects along the first surface of the collection conveyor toward the evacuation conveyor.

21. The system of claim 20, wherein the collection conveyor spans a width of the trailer of the tractor trailer.

22. The system of claim 20, wherein the collection conveyor is rotatable with respect to the evacuation conveyor to provide an angle with respect to horizontal of between a first angle of about 5 degrees and a second angle about 95 degrees.

23. The system of claim 22, wherein the collection conveyor spans a height of the trailer of the tractor trailer when rotated to the second angle.

24. The system of claim 20, wherein said coupled end of the collection conveyor is higher in elevation than the base end of the collection conveyor when the collection conveyor initially engages the plurality of objects in the trailer of the tractor trailer.

25. The system of claim 20, wherein the collection conveyor includes an active belt conveyor.

26. The system of claim 20, wherein the collection conveyor includes an active roller conveyor.

27. The system of claim 20, wherein the evacuation conveyor includes an elevation system that elevationally adjusts the evacuation conveyor together with the coupled end of the collection conveyor.

28. The system of claim 20, wherein the evacuation conveyor includes a ramp section that couples with a facilities conveyor, the ramp section providing an elevation drop to the facilities conveyor.

29. The system of claim 28, wherein the system includes a dynamic engagement assembly such that the ramp section may dynamically engage the facilities conveyor as the evacuation conveyor is raised and lowered.

30. The system of claim 29, wherein the dynamic engagement assembly includes rollers, and wherein the ramp section includes a tapered width that narrows toward the facilities conveyor.

31. The system of claim 20, wherein the system further includes at least one upper trailer engagement perception unit directed toward an upper area of the plurality of objects.

32. The system of claim 20, wherein the system further includes at least one lower trailer engagement perception unit directed toward a lower area of the plurality of objects.

* * * * *